United States Patent [19]

Fong et al.

[11] Patent Number: 4,886,872

[45] Date of Patent: Dec. 12, 1989

[54] NOVEL CATIONIC HYDROXAMATE POLYMERS

[75] Inventors: Dodd W. Fong, Naperville; Josepha M. Fu, Chicago, both of Ill.

[73] Assignee: Nalco Chemical Company, Naperville, Ill.

[21] Appl. No.: 355,269

[22] Filed: May 22, 1989

[51] Int. Cl.[4] .................... C08F 20/58; C08F 220/32
[52] U.S. Cl. ................. 525/329.4; 525/329.9; 525/330.1; 525/330.5; 525/330.6; 525/327.3; 525/366; 525/380; 526/246; 526/311
[58] Field of Search ............... 525/329.4, 329.9, 330.1, 525/330.5, 330.6, 327.3, 366, 380; 526/240, 311

[56] References Cited

U.S. PATENT DOCUMENTS

Re. 28,474   7/1984   Anderson et al.
3,154,499  10/1964   Fetscher.
3,284,393  11/1966   Vanderhoff et al.
3,345,344  10/1967   Fetscher et al.

FOREIGN PATENT DOCUMENTS 560782   4/1960   Belgium.
852176  10/1960   United Kingdom.
887175   1/1962   United Kingdom.

OTHER PUBLICATIONS

"The Systnesis of Poly(Hydroxamic Acid) from Poly(Acrylamide)" by A. J. Domb, E. G. Cravalho, R. Langer, from J. Polymer Science, Dec. 1987.
"Chelating Ion-Exchangers Containing N-Substituted Hydroxylamine Functional Groups, Part III, Hydroxamic Acids" by F. Vernon and H. Eccles, Analytica Chimica Acta, 82(1976) 369-375.
"Chelating Ion-Exchangers Containing N-Substituted Hydroxylamine Functional Groups, Part IV, Column Separations on a Hydroxamic Acid Resin", by F. Vernon and H. Eccles, Analytica Chimica Acts, 83(1976) 187-193.
"Chelating Ion-Exchangers Containing N-Substituted Hydroxylamine Functional Groups, Part V, Iron, Copper and Uranium Separations on Duolite CS-346Resin", by F. Vernon and H. Eccles, Analytica Chimica Acta 94(1977) 3-17-322.
"Chelating Ion-Exchangers Containing Salicylic Acid" by F. Vernon and H. Eccles, Analytica Chimica Acta, 72 (1974) 331-338.
"Chelating Ion-Exchangers Containing N-Substituted Hydroxylamine Functional Groups, Part I, N-Aroylphenylhydroxylamines", by F. Vernon and H. Eccles, Analytica Chimica Acta, 77(1975) 145-152.
"Chelating Ion-Exchangers Containing N-Substituted Hydroxylamine Functional Groups, Part II, N-Acrylphenylhydroxylamines", by F. Vernon and H. Eccles, Analytica Chimica Acta, 79(1975) 229-236.
"Hydroxylamine in the High-Temperature Dyeing of Acrylic Fibres" Jo. Soc. Dyers & Colourists, vol. 75, by F. Schouteden, p. 309.
Chemical Abstract 65, 15532q 1966.
Chemical Abstracts 77(24): 153114e.
Chemical Abstract 94(14): 104189a.
Chemical Abstract 99(26): 224042x.
"Chelating Ion Exchangers-the Synthesis and Uses of Poly(Hydroxamic Acid) Resins" by F. Vernon, Pure & Appl. Chem., vol. 54, No. 11, pp. 2151-2158 (1982).

Primary Examiner—Joseph L. Schofer
Assistant Examiner—T. McDonald, Jr.
Attorney, Agent, or Firm—John G. Premo; Donald G. Epple; Anthony L. Cupoli

[57] ABSTRACT

A polymer having a weight average molecular weight ranging from between about 1,000 to about 10,000,000 which polymer contains at least 5 mole percent of a pendant functional group represented by:

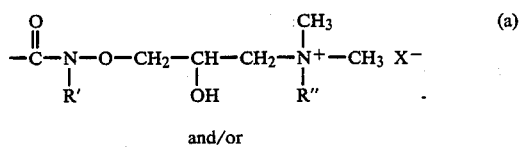

and/or

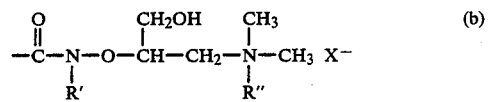

and mixtures thereof; wherein R' is chosen from the group consisting of H, and lower linear or branched alkyl groups containing from one to six carbon atoms; and X is an anionic gegenion, present in an electroneutralizing amount.

10 Claims, No Drawings

NOVEL CATIONIC HYDROXAMATE POLYMERS

INTRODUCTION

The use of cationic and amphoteric polymers are known in the art for corrosion inhibition, flocculation, dispersion, and/or other uses, such as in the manufacture of paper goods, as coagulants, and in treating Bayor liquors for removal of humate products.

However, in spite of the uses that have been developed for cationic polymers, the type of cationic polymers that are available, particularly those polymers which are water soluble, are limited in structure.

It is an object of this invention to provide for the formation of cationic polymers of an entirely new chemical structure, which structure is derived from hydroxamic acid polymers.

It is also an object of this invention to provide a new type of cationic polymer that may be useful in those uses cited above. It is expected that these new cationic polymers will be found to be particularly active as dispersants and flocculants, depending upon molecular weight.

Several people have formed or synthesized various types of polymers, some containing the hydroxamic acid functional group. Such disclosures are, for example, contained in the following references, all of which are incorporated herein by reference.
1. U.S. Pat. No. Re. 28474, 7/8/74, Anderson, et al
2. U.S. Pat. No. 3,284,393, 11/8/66, Vanderhoff, et al
3. U.S. Pat. No. 3,345,344, 10/3/67, Fetscher, et al
4. U.S. Pat. No. 3,154,499, 10/27/64, Fetscher
5. Great Britain Patent 852176, 10/26/60
6. Great Britain Patent 887175, 1/17/62
7. Belgium Patent, 560782, 4/22/60
8. "The Synthesis of Poly(Hydroxamic Acid) From Poly(Acrylamide)" by A. J. Domb, E. G. Cravalho, R. Langer, from *J. Polymer Science*, December, 1987
9. Chemical Abstract 77(24): 153114e
10. Chemical Abstract 94(14): 104189a
11. "Synthetische Makromolekulare Stoffe mit Reaktiven Gruppen" W. Kern and R. C. Schultz, *Angew. Chem.*, 69. 1957, No. 5, p. 153
12. "Hydroxylamine in the High-Temperature Dyeing of Acrylic Fibres" *Jo. Soc. Dyers & Colourists*, Vol. 75, 1959, by F. Schouteden, p. 309
13. Chemical Abstract 65, 15532q 1966
14. "Chelating Ion-Exchangers Containing Salicylic Acid" by F. Vernon and H. Eccles, *Analytica Chimica Acta*, 72(1974)331–338
15. "Chelating Ion-Exchangers Containing N-Substituted Hydroxylamine Functional Groups, Part I. N-Aroylphenylhydroxylamines", by F. Vernon and H. Eccles, *Analytica Chimica Acta*, 77(1975)145–152
16. "Chelating Ion-Exchangers Containing N-Substituted Hydroxylamine Functional Groups, Part II. N-Acrylphenylhydroxylamines" by F. Vernon and H. Eccles, *Analytica Chimica Acta*, 79(1975)225–236.
17. "Chelating Ion-Exchangers Containing N-Substituted Hydroxylamine Functional Groups, Part III. Hydroxamic Acids" by F. Vernon and H. Eccles, *Analytica Chimica Acta*, 82(1976)369–375
18. "Chelating Ion-Exchangers Containing N-Substituted Hydroxylamine Functional Groups, Part IV. Column Separations on a Hydroxamic Acid Resin", by F. Vernon and H. Eccles, *Analytica Chimica Acta*, 83(1976)187–193.
19. "Chelating Ion-Exchangers Containing N-Substituted Hydroxylamine Functional Groups, Part V. Iron, Copper and Uranium Separations on Duolite CS-346 Resin", by F. Vernon and H. Eccles, *Analytica Chimica Acta*, 94(1977)317–322
20. Chemical Abstract 99(26):224042x
21. "Chelating Ion Exchangers—The Synthesis and Uses of Poly(Hydroxamic Acid) Resins" by F. Vernon, *Pure & Appl. Chem.*, Vol. 54, No. 11, pp. 2151–2158, 1982.

In addition, some of the patents in the above list also present evidence for the modification of these hydroxamic acid polymers, such that nitrogen substituted functionalities can exist for a particular purpose.

However, none of the references cited above, or known to the inventors, provide for the substitution of the hydroxamic acid oxygen with functional capabilities on a polymeric structure which also include cationic modifications.

It is therefore another object of this invention to provide for hydroxamic acid substituted polymers where the substitution is connected to the hydroxamic acid oxygen and which substitution provides for cationic functional groups connected to a polymer backbone via a hydroxamic ester functional linkage. By accomplishing these reactions, we have accomplished the formation of polymers which have to date been unknown, which polymers may have the uses cited above and which polymers provide for other alternatives than the relatively limited number of cationic polymers available at the present time.

THE INVENTION

We have invented polymers having a weight average molecular weight ranging from about 1000–10,000,000, which polymers contain at least 5 weight percent of a pendant chemical functional group represented by the structures: FIG. 1:

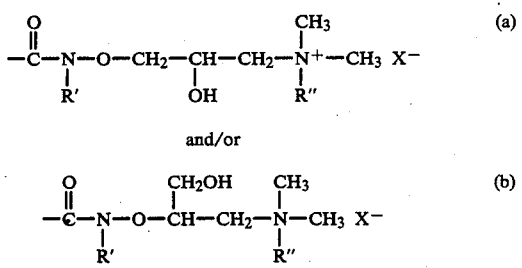

and mixtures thereof.

In FIG. 1, at every occurrence, R' represents hydrogen or a lower alkyl group containing from 1–6 carbon atoms, which alkyl group may be linear or branched. R" may be H, a $C_1$–$C_{12}$ linear, branched or cyclic alkyl group, or may be $C_6$–$C_{12}$ aromatic, aralkyl, or alkaryl hydrocarbon group. In these formulas, X is an gegenion which is anionically charged and is present in an electroneutralizing amount so as to neutralize the cationic charge on the quaternary nitrogen of this functional group.

This anionic gegenion may be represented, for example, by fluoride anions, chloride, bromide, iodide, nitrate, sulfate and such other anions that neutralize the positive charge on the backbone of the polymer, including, but not limited to, other such anions such as bisulfate, bisulfite, phosphate, biphosphate, phosphonate, any mixture thereof, and the like.

Preferably, the polymers containing the new hydroxamic acid ester functionality represented in FIG. 1 above are vinylic polymers, although these polymers may not necessarily be vinylic polymers depending on the backbone polymer from which the reaction sequences are accomplished. However, the starting polymers must contain some pendant functional group which can be converted into a pendant hydroxamic acid or alkyl substituted hydroxamic acid group.

Preferably, the vinylic polymers, which contain the hydroxamic acid ester structures represented in FIG. 1 above are water soluble and have a weight average molecular weight ranging between about 2000 and about 7,000,000 and most preferably have a molecular weight ranging between about 2,500 and about 5,000,000. When a molecular weight is relatively low, i.e. ranging between about 1,000 to about 100,000, it is expected that these materials would have dispersant properties, for example for pigments, or in mining applications. When the molecular weight is higher, e.g. between about 500,000 to about 10,000,000, it is expected that these materials would act as flocculants, coagulants, sludge dewatering agents, and the like.

It is preferable that the vinylic polymers containing the hydroxamic acid esters represented in FIG. 1 are those polymers wherein a vinylic monomer unit is repeated either randomly or regularly at at least 5 mole percent within the vinylic polymer backbone, which vinylic mer unit is represented by the structures in FIG. 2, where, at each occurrence, R is chosen from hydrogen and methyl functional groups, and R' are, at each occurrence, chosen from the group consisting of hydrogen and $C_1-C_6$ alkyl, either linear or branched groups, with all other designations, at each occurrence, being those described above. FIG. 2:

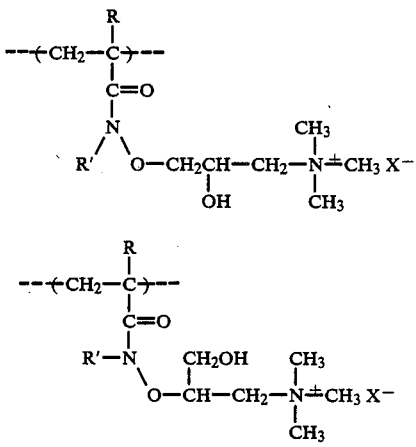

or mixtures thereof.

The vinylic polymers which contain the hydroxamic acid ester functional groups represented in FIGS. 1(a) and (b) and the repeated vinylic mer units (a) or (b) of FIG. 2 represent polymers having a molecular weight of from 1,000–10,000,000, preferably vinylic polymers, as in FIG. 2 above, having a molecular weight from 2,000–7,000,000, and most preferably water soluble vinylic cationic polymers having a molecular weight between about 2,500–5,000,000.

All molecular weight of polymers herein are weight average molecular weights.

The polymers of this invention are formed from a starting vinylic polymer which contains at least one of the monomer units chosen from the group consisting of acrylamide, methacrylamide, acrylic acid, methacrylic acid, methyl or ethyl acrylate, methyl or ethyl methacrylate, or any admixtures of these monomer units.

The modified polymers of this invention are formed by reacting a backbone polymer, which backbone polymer has a molecular weight ranging from about 500 to about 10,000,000, which backbone polymer is manufactured from the monomers cited above, or which may also be manufactured from these cited monomers along with other vinylic monomers, such as, but not limited to, diallyldimethylammonium chloride, the cationic vinyl amides or the cationic vinyl esters known in the art, such as DMAEA, DMAEM, as well as other vinylic acids, such as, but not limited to, maleic anhydride, fumaric acid, crotonic acid, and the like.

When we discuss the vinyl acids, such as acrylic acid, methacrylic acid, maleic acid, fumaric acid, crotonic acid, and the like, we mean to include any salt or mixture of salt and acid functional groups which may be formed when these acids are partially or completely neutralized in the presence of a basic compound. These acid salts can include, but are not limited to, the alkali metal salts, the alkaline earth metal salts, amine salts, quaternary amine salts, wherein the amine salts can include primary, secondary or tertiary amine salts, and the like, or any mixtures thereof. The salts could also include transition metal salts, such as, but not limited to, iron salts, copper salts, and the like. The salt formation of the carboxylate acid can be formed either prior to backbone polymer formation or can be formed after backbone polymer formation by the addition of basic compounds which contain these various metal or amine cations.

In the description of $X^-$ above, it is preferred that $X^-$ be chosen from an halide anion or from sulfate. It is most preferred that the anion be chosen from the group consisting of chloride, bromide, iodide, and sulfate, or mixtures thereof.

THE BACKBONE POLYMERS

The backbone polymers which are used to form the polymers of this invention, may include homo- or co-polymers of acrylamide, homo- or co-polymers of acrylic acid, homo- or co-polymers of methacrylamide, homo- or co-polymers of methacrylic acid, homo- or co-polymers of methylacrylate, and homo- or co-polymers of ethylacrylate. In addition, homo- or co-polymers of methylmethacrylate or homo- and co-polymers of ethylmethacrylate may also be used to form these products. The term copolymer is used herein to describe a polymer having two or more repeating mer units.

The reactions which are chosen to begin the transition of the above backbone polymers to polymers of this invention depend upon which starting polymer is chosen, e.g. if a homopolymer of acrylamide is chosen, this material may be reacted with hydroxylamine or an N-alkyl substituted hydroxylamine at temperatures ranging between about 5° C. to about 45° C. and at pH's ranging from about 7.0 to about 13. As the temperature and pH increase, the chance of the homopolymer of acrylamide hydrolyzing to form a polymer having not only the hydroxamic acid substituted acrylamide functionality, but also a polymer that contains carboxylic acid substitution as well, increases. However, once the hydroxamic acid containing polymer is formed, this hydroxamic acid substituent polymer may then be reacted with a glycidyltrialkylammonium chloride to obtain the functional groups represented by FIG. 1, or a polymer with repeating mer units as represented by FIG. 2. Once this material has been formed, the anions may be exchanged simply, as known in the art, to obtain the gegenion of choice.

In addition, to form the the hydroxamic acid modified polymers from, e.g. an acrylamide pendant containing polymer, not only is the backbone polymer reacted with hydroxylamine but the backbone polymer may also be reacted with an N-alkyl-substituted hydroxylamine. When an N-alkyl-substituted hydroxylamine is used, the final product is one which is represented in FIG. 1 or FIG. 2 by having an R' alkyl group substituted on the nitrogen of the hydroxamic ester functional group, which alkyl group may contain from 1-6 carbon atoms and which alkyl group may also be linear or branched. Preferably, this alkyl group, represented by R' above, contains from 1-4 carbon atoms, but most preferably, the R' group is either a hydrogen or a methyl group.

In addition to using an acrylamide or methacrylamide based backbone polymer or copolymer, the reaction with hydroxylamine or an alkyl substituted hydroxylamine to form a hydroxamic acid substituent on the polymer is also feasible for polymers derived from or containing acrylic acid, methacrylic acid, maleic anhydride, or other vinylic acids, to form the hydroxamic acid polymers. These hydroxamic acid modified polymers may in turn be used to react with the glycidyltrialkylammonium salts described above to form the hydroxamic acid esters represented above.

For example, the reaction of a homopolymer of acrylic acid with hydroxylamine at a pH ranging from about 1-6 and a temperature ranging between about 75°-145° C. is known. As can be seen, these carboxylic acid modifying reaction conditions are different from those reaction conditions which are used to convert acrylamide or methacrylamide containing polymers to the hydroxamic acid modified polymers found useful to form the hydroxamic acid esters of this invention.

Polymers containing carboxylate ester groups such as those contained in polymers made using ethyl or methyl acrylate, are also capable of forming the hydroxamic acid ester substituents of this invention. Reacting a pendant ester functional group from the polymer with hydroxylamine or alkyl substituted hydroxylamines at elevated temperatures and under controlled pH conditions, followed by the reactions with our glycidyl quaternary salts achieves the structures above.

Therefore, any backbone polymer which contains pendant functional groups chosen from the group containing amide functional groups, carboxylic acid functional groups, alkyl carboxylate esters, and the like, or mixtures thereof, may be reacted with hydroxylamine or an alkyl substituted hyroxylamine under appropriate reaction conditions to form a polymer which contains, as a pendant group, a hydroxamic acid functional group.

The backbone polymers may be water soluble or water insoluble and reactions may be accomplished as a solution reaction where the polymer chosen as a backbone starting polymer is in solution, or the backbone polymer may be in the form of a dispersion in water or a dispersion in an oleophilic phase depending upon whether or not the backbone polymer is water soluble or water insoluble. In addition, the backbone or starting polymer may be found in the form of an emulsion which contains both oil and aqueous phases, wherein the starting polymer may be soluble in a water phase dispersed in a continuous oil emulsion, or may be found in an oil phase containing oil soluble polymers dispersed in aqueous emulsions. It is most preferred that the polymers which are used as starting polymers are vinylic type water soluble polymers, such as those polymers obtained by forming homo- or co-polymers of acrylic acid, methacrylic acid, acrylamide, methacrylamide, maleic anhydride, fumaric anhydride, or mixtures thereof, and the like. These polymers may be in aqueous solution, or may be dispersed in a water-in-oil emulsion such as those described in U.S. Pat. No. 3,284,393 and Re No. 28474, both of which are incorporated herein by reference.

THE HYDROXYLAMINE REACTANTS

Any hydroxylamines represented by the structure: HONHR', may be used to react with reactive pendant functional groups, described above, on the starting polymers. Again, R' is H or any of the alkyl groups described above. R' is most preferably chosen from H and $C_1$-$C_6$ alkyl groups. Henceforth, the term hydroxylamine, as used herein, refers both to the molecule, $HONH_2$, and to the $C_1$-$C_6$ alkyl substituted hydroxylamines described above.

REACTION pH AND TEMPERATURE

The pH of the systems during the reaction with hydroxylamine depends on the starting polymer chosen. For example, if the starting polymer contains carboxylic acid monomer units as the only species reactive with hydroxylamines, then the pH is preferably controlled between about 1 to about 6. This pH control can be achieved by either the polyacrylic acid used itself, whether a homopolymer or copolymer, or by the addition of inorganic acids, buffering agents or other acid groups which do not interfere with the conversion of these polymeric carboxylate functional groups by reaction with our hydroxylamine reactants to form the polymeric hydroxamic acid groups. The preferred pHs in the practice of the invention when the starting polymer contains a carboxylic acid functional group normally range between about 2-5, and the most preferred range of pH is between about 3-4. The reaction temperatures used to convert carboxylic acid pendant groups on polymers range between about 75° C. to about 150° C., preferably between about 75° C. to about 140° C., and most preferably range between about 80° C. to about 120° C. Above a temperature of about 120° C. the decomposition of hydroxylamine becomes significant, thereby reducing the yield of hydroxamic acid bearing polymers. Typical reaction times to form the hydroxamic acid substituted polymers are normally at least 3 hours, preferably at least 4 hours, and most preferably range between about 5-8 hours.

When using an amide containing backbone polymer such as an acrylamide or methacrylamide based polymer as the starting material to be reacted with the hyroxylamine reactants, it is more common to accomplish the modifying reaction between a pH of about 7.0 and about 13.0 and at temperatures considerably below those temperatures required to make this substitution when using a carboxylic acid based polymer. The amide modifying reaction temperature normally runs between about 5° C. to about 45° C. and is most preferably accomplished between about 10° C. to about 35° C. The pH is most preferably between about 8 and about 12 or higher. The amide group modification reaction occurs rapidly at room temperature, and can achieve over 70% yields, based upon amide groups contained in the starting polymer. Again, these starting polymers may be water soluble, water dispersible, or may be in the form of a water-in-oil emulsion. If the amide containing polymer is initially water insoluble, it may be dispersed in water or may be in an oil-in-water emulsion. It is preferred that the starting polymers be water soluble and that the hydroxylamine reactants be added either to an aqueous solution of the starting polymer, or to a water-in-oil emulsion containing the starting polymer.

In a similar fashion, backbone polymers containing pendant ester groups may be reacted with hydroxylamine or alkyl substituted hydroxylamines. This reaction is also known to form hydroxamic acid pendant group containing polymers. Some of these precursor reactions are outlined in the patents earlier cited in this specification, which patents have all been incorporated herein by reference.

THE GLYCIDYL CATIONIC AMINE REACTANT

The glycidyl cationic amine reactant of the invention has a structure set forth in FIG. 3 below. FIG. 3:

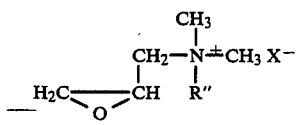

wherein R" is defined as above. R" is preferably chosen from hydrogen, methyl groups, $C_2$–$C_6$ alkyl (branched or linear) groups, and mixtures thereof. R" is preferably methyl, ethyl, or propyl groups.

Also, in the formula of FIG. 3, X is again the anions described above, present in electroneutralizing amounts. Preferably X is the chloride anion or the sulfate anion, but it may also be the hydroxide anion or some other common anion achieved through anion exchange reactions from a starting material which normally is the glycidyl cationic quaternary amine chloride salt. These glycidyl trialkyl quaternary amine salts may be manufactured by reacting epichlorohydrin with the corresponding amine, R"—N(CH$_3$)$_2$.

The reaction of this glycidyl cationic species as represented in FIG. 3 with the hydroxamic acid polymers earlier described easily achieves an opening of the glycidyl oxirane ring and accomplishes the structures represented in FIG. 1 and FIG. 2 above and in FIG. 4 below. Since the oxirane oxygen ring of the glycidyl cationic salt of FIG. 3 can react in such a way as to form two separate alcohol functional groups, the reaction sequence can lead to the structures of FIGS. 1, 2, and 4, or admixtures of those structures.

The polymers of this invention are obtained by the reaction of the backbone polymers with hydroxylamine reactants, then followed by the reaction with, for example, the glycidyltrimethylammonium chloride, to achieve the above structures. The preferred cationic polymers are those in which the hydroxylamine reactants are reacted with a backbone polymer to form a hydroxamic acid substituted polymer product, which product is then reacted with glycidyltrimethylammonium chloride.

THE PREFERRED CATIONIC POLYMERS

Once the base polymers have been reacted with the hydroxylamine reactant, an intermediate polymer product is normally formed which contains anywhere from about 5 mole percent up to about 95 mole percent of a mer unit substituent having an hydroxamic acid or alkyl substituted hydroxamic acid, or mixtures thereof, functional groups. The reactions to form the hydroxamic acid or alkyl substituted hydroxamic acid modified polymers, which reactions are cited above, also give the operator practicing this invention the possibility of using copolymers of acrylic acid or methacrylic acid with monomers such as acrylamide or methacrylamide to control and to form the most preferred cationic polymers of our invention, which polymers may also contain carboxylate functionality and/or amide functionality, dependent on the choice of reaction sequence, the reaction conditions, and/or ratio of reactants.

Therefore it is quite easily accomplished to form polymers as described in FIG. 4 below:

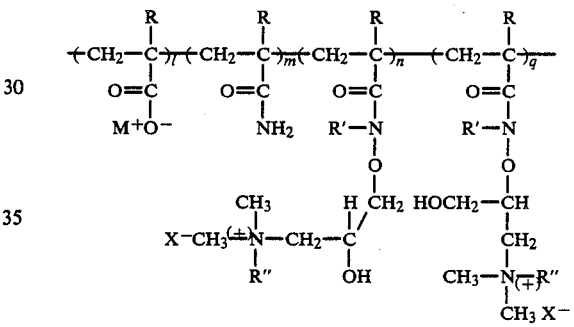

FIG. 4

In FIG. 4, at each occurrence, R is again independently chosen from the group consisting of hydrogen and methyl. Likewise, M represents hydrogen, any alkali metal cation, and any electroneutral amount of an alkaline earth cation, any protonated primary, secondary, or tertiary amine, or a quaternary amine. Also, at each occurrence, M may also be chosen from mixtures of the above cationic species, or from cationic species which are from the transition metals.

In FIG. 4, at each occurrence, R' is again chosen from the group consisting of hydrogen and $C_1$–$C_6$ alkyl groups, which alkyl groups may be linear or branched. And, at each occurrence, X is an anion which is present in electroneutral amounts to neutralize the cationic nitrogen group, as earlier described above.

In FIG. 4, the monomer unit represented by l normally is present in such amount as to account for at least 5 mole percent of the polymer. Likewise, the monomer unit represented by m is present so as to account for from zero to at least 5 mole percent of the polymer. Finally, the monomer units represented by n and q may be present, either singly or in sum, in such number as to represent at least 10 mole percent of the polymer. However, q, but not n, may be zero.

Preferably, l, m, and n and q are integers which accomplish the presence of the mer unit represented by each of them in the ranges above and further accomplishes a weight average molecular weight which ranges between about 1,000–10,000,000, preferably between about 2,000–7,000,000, and most preferably between about 2,500–5,000,000. The integers m and q may be zero, but when acrylamide or methacrylamide based starting polymers are used, m is such that the monomer unit represented by m accounts for at least 5 mole percent of the cationic polymer.

M in FIG. 4 is a cation preferably chosen from hydrogen and alkali metal cations such as sodium, potassium, and the like. M, however, also may represent the protonated amines or quaternary amines which are typically used to neutralize carboxylate groups, for example, the tetramethylammonium cationic functional group. M may represent admixtures of cations.

R' is preferably chosen in FIG. 4 from the group consisting of hydrogen and methyl groups and is most preferably simply hydrogen. X in FIG. 4 is again preferably chosen from halide anions and sulfate, or combinations thereof, and is most preferably chosen from chloride, bromide, iodide and sulfate, or mixtures thereof. When sulfate is present, it is present in electroneutralizing amounts relative to the polymeric quaternary ammonium substituent.

The monomers represented by l, m, and n or q in FIG. 4 are preferably monomers which are randomly distributed within the cationic polymer. The monomer represented by l is preferably present between about 10–50 mole percent. The monomer represented by m is preferably present between about 0–40 mole percent of the polymer. Finally, the monomer unlits, or mer units, represented by either q or n, or the sum of mer units represented by both q+n, i.e. the hydroxamic ester substituent, are present between about 10–70 mole percent of the polymer. Again, both m and q may be zero. However, it is to be noted that the random distribution can be easily converted to either regular or block distribution by appropriate choice of the starting polymer and a following reaction sequence which converts a high yield of the starting reactant pendant group to the hydroxamic acid ester of this invention. Therefore, our terminology describing the randomly distributed mer unit, or monomer units, is meant to include the special so-called block mer unit distribution occurring in any sequence.

It is most preferable and common in the practice of our invention to have a polymer as represented in FIG. 4 be that polymer where R is hydrogen, R' is hydrogen, M is chosen from at least one of the group hydrogen, sodium, potassium, tetramethylammonium cation, protonated trimethylamine, and the like. It is also most common when X is at least one of the group chloride, sulfate or mixtures thereof.

It is also most preferred to form the polymers of FIG. 4 such that the monomer unit represented by l ranges between about 20–30 mole percent of the polymer. Likewise, the monomer unit represented by m ranges most preferably between about 25–35 mole percent of the polymer, and the monomer unit represented by n ranges between about 35–55 mole percent of the polymer, with the monomer unit represented by q supplying the remainder percentage to account for 100% of the mer units present in the polymer.

To better exemplify our invention, the following examples are provided.

EXAMPLES

Table 1 presents the results obtained by reacting an acrylhydroxamic acid polymer having the compositions indicated in column 1 of this Table with a particular and described mole percent charge of glycidyltrimethylammonium chloride under reaction conditions which included a temperature of from 20°–35° C. and at a pH ranging between about 9 to about 13. To determine cationic character, the products obtained were either titrated for cationic charge using a common colloid titration technique known in the art, or the polymers were purified by dialysis and examined by $^{13}C$ nuclear magnetic resonance spectroscopy. The mole percent of cationic charge is equivalent to the mole percent of the substituted hydroxamic acid ester as described in the specification as FIG. 1.

In each of the cases described in Table 1, the final polymer has a structure which may be described by FIG. 4 above, and wherein various mole percentages of each randomly repeating mer unit have been determined. In those situations where no cationic charges were originally found by titration, merely extending the reaction time permitted the reaction to continue so that cationic charge is formed.

TABLE 1

| EXAMPLE | POLYMER[1] COMPOSITION ACRYLAMIDE/ ACRYLATE/ ACRYLHYDROXAMIC ACID | MOLE % CHARGE OF GLYDICYL TRIMETHYLAMMONIUM CHLORIDE BASED ON TOTAL MER UNITS | MOLE % CATIONIC CHARGE BY TITRATION | COMPOSITION BY C13 NMR ACRYLAMIDE/ ACRYLATE/ SUBSTITUTED HYDROXAMIC ACID |
|---|---|---|---|---|
| 1 | —/—/70[2,3] | 50 | 38[5] | — |
| 2 | —/—/70[4,6] | 100 | 0[7] | — |
| 3 | —/—/70[4,6] | 100, 150[9] | 0[7] | — |
| 4 | —/—/20[2,8] | 20 | 12 | — |
| 5 | —/—/20[2,8] | 20 | 0[7],10[5] | — |
| 6 | —/—/30 | 30, 30[9] | 0[7],31[5] | — |
| 7 | —/—/70 | 100 | 53 | — |
| 8 | 37/10/53[10] | 53 | — | 30/27/43[10] |
| 9 | 41/28/31[10,11] | 31 | — | 40/33/26[10] |

TABLE 1-continued

| EXAMPLE | POLYMER[1] COMPOSITION ACRYLAMIDE/ ACRYLATE/ ACRYLHYDROXAMIC ACID | MOLE % CHARGE OF GLYDICYL TRIMETHYLAMMONIUM CHLORIDE BASED ON TOTAL MER UNITS | MOLE % CATIONIC CHARGE BY TITRATION | COMPOSITION BY C13 NMR ACRYLAMIDE/ ACRYLATE/ SUBSTITUTED HYDROXAMIC ACID |
|---|---|---|---|---|
| 10 | 0/55/45[10] | 45 | — | 0/55/45[10] |

NOTES:
[1]Estimated composition.
[2]Polymers purified by precipitation.
[3]Mw ~ 24,000
[4]Mw ~ 4,600
[5]Reaction was allowed to go for one day.
[6]Samples contained an unknown amount of residual hydroxylamine.
[7]Reaction was allowed to go for ½ to 2 hours.
[8]Intrinsic viscosity of the polymer was 16.5.
[9]More glycidyltrimethylammonium chloride was added after the first colloid titrations were done.
[10]By 13C NMR.
[11]Acrylamide/acrylate/N—methylacrylhydroxamic acid.

Except for Example 10, the starting polymers used to generate the cationic polymers of Table 1 were obtained by reacting acrylamide homopolymers or copolymers of acrylamide and acrylic acid with hydroxylamine at room temperature at a pH ranging from about 7.5–12.5. Side reactions, such as hydrolysis of amide groups, can be minimized by lower temperatures and lower pH.

In Example 10, we have reacted hydroxylamines with a homopolymer of polyacrylic acid, the products of which were highly substituted polyhydroxamic acids copolymers also containing acrylic acid mer units, but no acrylamide mer units. These copolymers were then also reacted with the glycidyltrimethylammonium chloride under the same reaction conditions used above, which reaction conditions included adding the glycidyltrimethylammonium chloride reactant to the polymers containing both hydroxamic acid and carboxylic acid groups to form a polymer which has been modified to contain the hydroxamate cation functional groups of this invention.

EXAMPLES SUMMARY

The reaction of glycidyltrimethylammonium chloride, a product of commerce, occurs readily in aqueous solution at room temperature to achieve at least a 90% conversion of the hydroxamic acid functional groups to the hydroxamic acid ester functional group represented by FIG. 1 above. Care should be taken to remove any unreacted hydroxylamine reactants from the polymer mixture prior to the addition of the glycidyl trimethylammonium chloride since the glycidyl cationic reactant will also react with the reactant hydroxylamines.

The reaction may also occur in a water-in-oil latex in which the aqueous dispersed particle contains, dissolved or dispersed therein, the polymer which has been converted to a hydroxamic acid containing polymer. The water-in-oil emulsion is normally used when the reactions involve very high molecular weight polymeric products, e.g. having molecular weights of from about 500,000 to about 10,000,000.

To date, the reaction appears to go as effectively with high or low molecular weight hydroxamic acid modified backbone polymers, wherein the molecular weight ranges between about 1,000 up to and including about 10,000,000.

For example, the polymers contained in Table 1 ranged in molecular weight from about 4,000 up to and including a polymer which measured an intrinsic viscosity of 16.5. This intrinsic viscosity would provide for a molecular weight of at least 5,000,000 and probably about 10,000,000. Reaction times with the glycidyl cationic quaternary salt product may be extended at the higher molecular weights in order to achieve above 40–50% conversion of hydroxamic acid functionality to the cationic hydroxamic acid esters of this invention.

By reacting homopolymers of acrylic acid with hydroxylamine at the higher temperatures described above, a final product is obtained which contains repeating units of acrylic acid and the acrylhyroxamic acid per mer unit. This polymer is therefore free of any pendant amide functional group. By reacting this polymer with the glycidyltrimethylammonium chloride, one would expect to obtain a copolymer described in FIG. 5. below.

FIG. 5:

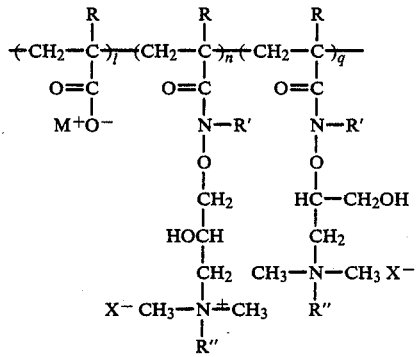

In FIG. 5, R, R', R", X, l, n, and q have their earlier described meanings. Preferably, in FIG. 5, R and R' are both independently chosen at each occurrence from hydrogen and methyl; M is generally a hydrogen proton or any cation or mixture of cations present in electroneutral amounts, which cation can be chosen from hydrogen, alkaline metal cations, alkaline earth cations, the primary, secondary, or tertiary protonated amines, the quaternary amines, or any admixture thereof as described above, and X is again an anionic gegenion neutralizing the quaternary nitrogen in the mer unit described by n and q.

It would be expected that these polymers could be manufactured where l represents a mer unit which is anywhere from 10 to about 90 mole percent of the polymer, and the sum of n plus q represents a mer units which are about 90 to about 10 mole percent of the polymer, depending on the starting polymers, the efficiency of reacting hydroxylamine therewith, and the effectiveness of the reaction with glycidyltrimethylammonium chloride. Again, q may be zero. The anion can be changed at will by practicing anion exchange technology known in the art, but is preferably chloride. Also, the sum of l+n+q is such that the weight average molecular weight ranges between about 1,000–10,000,000, preferably from 2,000–7,000,000, and most preferably between about 2,500–5,000,000.

The reactions above and the examples cited exemplify the general nature of the conversion of backbone polymers of acrylamide, acrylamide acid, or backbone polymers containing these monomers and/or alkyl substituents of acrylic acid and acrylamide with the hydroxylamine reactants to form hydroxamic acid polymers. These hydroxamic acid polymers react with the glycidyl trialkylammonium quaternary salts to form the cationic hydroxamic acid esters of this invention. However, this invention is not limited to this particular reaction sequence. It is anticipated that any polymer containing a pendant amide, ester, or carboxylate, either free acid or ester, group, and irrespective of its generation or the products or monomers used in its generation, may be subjected to the same series of reactions to form polymers containing the cationic hydroxamic acid esters of this invention. Therefore, it is expected that a reaction with the hydroxylamine reactants and any polymer which contains any degree of pendant carboxylic group, pendant amide group, or pendant ester group would yield hydroxamic acid containing polymers which would be subject to the reactions with the glycidyltrialkylammonium quaternary salts described above. These polymers would then develop cationic functionality and would be expected to contain the chemical moiety described in FIG. 1. By the term "pendant", we mean a functional group which is connected to a backbone of a polymer. This pendant functional group, so connected, would not be part of the polymer backbone itself.

Having described our invention, we claim:

1. A polymer having a weight average molecular weight ranging from between about 1,000 to about 10,000,000 which polymer contains at least 5 mole percent of pendant functional groups represented by:

(a)
$$-\overset{O}{\overset{\|}{C}}-\overset{}{\underset{R'}{N}}-O-CH_2-\overset{}{\underset{OH}{CH}}-CH_2-\overset{CH_3}{\underset{CH_3}{\overset{|}{N^+}-R''}} X^-$$

(b)
$$-\overset{O}{\overset{\|}{C}}-\overset{}{\underset{R'}{N}}-O-\overset{CH_2OH}{\underset{}{\overset{|}{CH}}}-CH_2-\overset{CH_3}{\underset{CH_3}{\overset{|}{N}-R''}} X^-$$

or mixtures thereof;
wherein R' is chosen from the group consisting of H, and lower linear or branched alkyl groups containing from one to six carbon atoms; R" is H, $C_1$-$C_{12}$ linear, branched, or cyclic alkyl group, or a $C_6$-$C_{12}$ aromatic, aralkyl, or alkaryl hydrocarbon group, and X is at least one of an anionic gegenion, present in an electroneutralizing amount.

2. A vinylic polymer having a weight average molecular weight ranging from about 1,000 to about 10,000,000, which polymer contains at least 5 mole percent of randomly distributed repeating monomer units represented by:

(b)
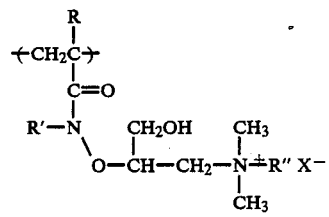

or mixtures thereof;
wherein R is chosen from the group consisting of hydrogen and methyl groups, and R', R" and X are the same as in claim 1.

3. The vinylic polymer of claim 2 wherein R and R', independently at each occurrence, are chosen from the group consisting of —H and —CH₃; where R" is at least one of methyl, ethyl, or propyl groups, where X is from the group Cl⁻, Br⁻, I⁻, SO₄⁼, or mixtures thereof, and wherein the molecular weight ranges between about 2,000 and about 7,000,000.

4. A water soluble vinylic polymer having a weight average molecular weight between about 1,000 to about 10,000,000, which polymer contains at least 5 mole percent of a mer unit having the structure:

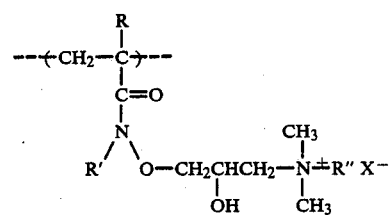

wherein R is chosen from the group consisting of —H and —CH₃; both R' and R", independently, at each occurrene, are chosen from the group consisting of —H and $C_1$-$C_6$ lower branched or linear alkyl groups, and X is at least one of an anionic gegenion, present in electroneutralizing quantities relative to the quaternized nitrogen, and chosen from the group consisting of F⁻, Cl⁻, Br⁻, I⁻, NO₂⁻, NO₃⁻, SO₃⁼, HSO₃⁻, HSO₄⁻, SO₄⁼, HCO₃⁻, CO₃⁼, OH⁻, and wherein the polymer also contains a remaining portion of randomly distributed vinylic mer units chosen from at least one of the monomer group consisting of acrylic acid, methacrylic acid, acrylamide, methacrylamide, methyl methacrylate, ethyl methacrylate, maleic acid, fumaric acid, crotonic acid, and the mer unit represented by:

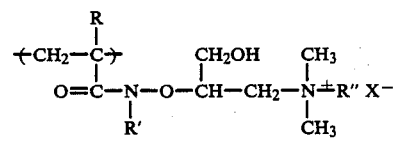

wherein R, R', R", and X have the above definitions.

5. The polymer of claim 4 wherein R is chosen from —H and —CH₃, and mixtures thereof; R' is chosen from —H and —CH₃, and mixtures thereof; R" is chosen from at least one of methyl, ethyl, and propyl groups; X is chosen from Cl⁻, Br⁻, I⁻, SO₄⁼, and mixtures thereof; and the polymer also contains randomly or block repeating mer units from at least one of the monomers chosen from the group consisting of acrylic acid, methacrylic acid, acrylamide, methacrylamide, and mixtures thereof, and further, wherein the weight average molecular weight ranges between about 2,000 to about 7,000,000.

6. A water soluble vinylic polymer containing randomly distributed mer units represented by the structure:

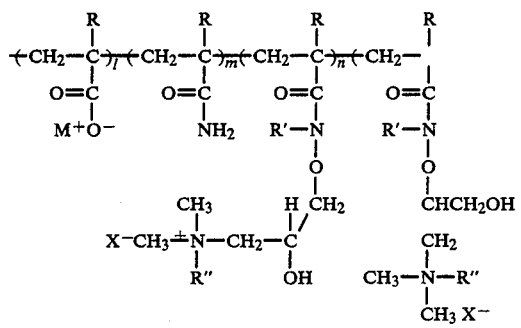

wherein M is an electroneutralizing amount of a cationic ion; R is chosen from —H and —CH$_3$; R' is chosen from —H and —CH$_3$; R" is an C$_1$-C$_6$ alkyl group; X is an anion chosen from Cl$^-$, Br$^-$, I$^-$, SO$_4^=$, and mixtures thereof; and wherein the mer unit represented represented by l is present in at least 5 mole percent of the polymer; the mer unit represented by m is present at between 0 to at least 10 mole percent of the polymer; and the mer unit represented by n and q are present, singly or in sum, in at least 10 mole percent of the polymer, and wherein the sum of l+m+n+q is such that the weight average molecular weight ranges between 1,000–10,000,000 and wherein m and q, but not l or n, may be zero.

7. The polymer of claim 6 wherein the sum of l+m+n+q is sufficient to obtain a molecular weight ranging between about 2,000 to about 7,000,000; and wherein m is zero and mer unit represented by l is present between about 10 mole percent to 90 mole percent and the mer unit represented by n, q, or the sum of n+q, are present between 90 to about 10 mole percent.

8. The polymer of claim 6 wherein the molecular weight ranges between about 2,500 to about 5,000,000, and further, wherein the mer unit represented by l ranges between about 10 to about 40 mole percent; the mer unit represented by m ranges between about 20 to about 50 mole percent; and the mer unit represented by n ranges between about 10 to about 70 mole percent of the polymer, and further wherein M is chosen from H$^+$, Na$^+$, K$^+$, NR$_4^+$, Mg$^{++}$, Ca$^{++}$, and mixtures thereof, where R is from H, CH$_3$, and mixtures thereof; and X$^-$ is chosen from Cl$^-$ and SO$_4^=$, and mixtures thereof.

9. The polymer of claim 8 wherein the molecular weight ranges between about 2,500 to about 500,000.

10. The polymer of claim 8 wherein the molecular weight ranges between about 500,000 to about 5,000,000.

* * * * *

UNITED STATES PATENT AND TRADEMARK OFFICE
CERTIFICATE OF CORRECTION

PATENT NO.   : 4,886,872

DATED        : DECEMBER 12, 1989

INVENTOR(S)  : NOVEL CATIONIC HYDROXAMATE POLYMERS

It is certified that error appears in the above-identified patent and that said Letters Patent is hereby corrected as shown below:

COLUMN 15, CLAIM 6, DELETE FORMULA AND REPLACE WITH CORRECTED FORMULA

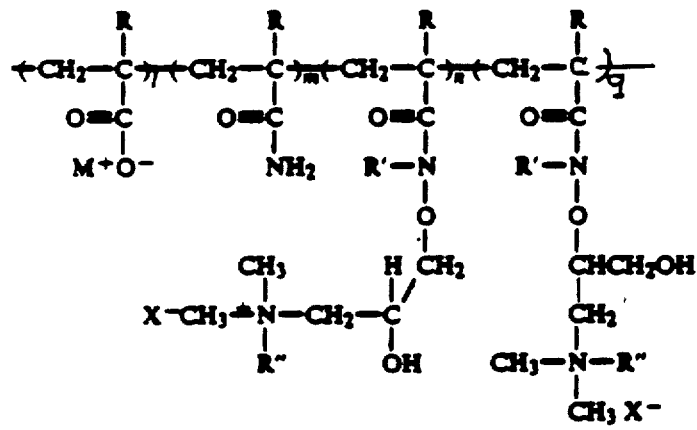

Signed and Sealed this

Eleventh Day of June, 1991

Attest:

HARRY F. MANBECK, JR.

Attesting Officer

Commissioner of Patents and Trademarks